(12) United States Patent
Lesage et al.

(10) Patent No.: US 10,611,464 B2
(45) Date of Patent: Apr. 7, 2020

(54) ELECTRO HYDROSTATIC ACTUATORS

(71) Applicant: Goodrich Actuation Systems SAS, Buc (FR)

(72) Inventors: Emmanuel Lesage, Aulnay sur Iton (FR); Serge Grand, Villebon sur Yvette (FR)

(73) Assignee: GOODRICH ACTUATION SYSTEMS SAS, Buc (FR)

(*) Notice: Subject to any disclaimer, the term of this patent is extended or adjusted under 35 U.S.C. 154(b) by 255 days.

(21) Appl. No.: 15/198,001

(22) Filed: Jun. 30, 2016

(65) Prior Publication Data

US 2017/0002845 A1 Jan. 5, 2017

(30) Foreign Application Priority Data

Jun. 30, 2015 (EP) .................................. 15306038

(51) Int. Cl.
*F04B 49/24* (2006.01)
*B64C 13/50* (2006.01)
(Continued)

(52) U.S. Cl.
CPC .......... *B64C 13/504* (2018.01); *B64C 13/341* (2018.01); *B64C 13/42* (2013.01); *B64C 13/505* (2018.01); *F04B 1/122* (2013.01); *F04B 1/143* (2013.01); *F04B 1/145* (2013.01); *F04B 1/146* (2013.01); *F04B 1/20* (2013.01); *F04B 17/03* (2013.01); *F04B 49/24* (2013.01);
(Continued)

(58) Field of Classification Search
CPC ............................ F15B 11/0423; F04B 49/24
See application file for complete search history.

(56) References Cited

U.S. PATENT DOCUMENTS

| 4,859,155 A | 8/1989 | Laqua |
| 4,934,143 A | 6/1990 | Ezell et al. |

(Continued)

FOREIGN PATENT DOCUMENTS

| CN | 103722996 A | 4/2014 |
| EP | 0395420 A2 | 10/1990 |

(Continued)

OTHER PUBLICATIONS

European Search Report Application No. 15306038.9 dated Feb. 11, 2016; 9 pages.

(Continued)

*Primary Examiner* — F Daniel Lopez
(74) *Attorney, Agent, or Firm* — Cantor Colburn LLP

(57) ABSTRACT

An electro hydrostatic actuator comprises a hydraulic pump driven by an electric motor to supply hydraulic fluid to a hydraulic actuator. The pump comprises an inlet and an outlet for the hydraulic fluid and an active flow path arranged therebetween such that, in an active mode of operation when the pump is driven by the electric motor, hydraulic fluid is actively drawn in through the inlet and exhausted out through the outlet. The pump further comprises a bypass flow path arranged to open between the inlet and outlet such that, in a damping mode of operation when the pump is not driven by the electric motor, hydraulic fluid is able to pass through the pump along the bypass flow path between the inlet and outlet.

8 Claims, 8 Drawing Sheets

(51) Int. Cl.
- *F15B 20/00* (2006.01)
- *B64C 13/42* (2006.01)
- *B64C 13/28* (2006.01)
- *F04B 1/20* (2020.01)
- *F15B 7/00* (2006.01)
- *F15B 11/024* (2006.01)
- *F04B 1/122* (2020.01)
- *F04B 1/143* (2020.01)
- *F04B 1/145* (2020.01)
- *F04B 1/146* (2020.01)
- *F04B 17/03* (2006.01)

(52) U.S. Cl.
CPC ............ *F15B 7/006* (2013.01); *F15B 11/024* (2013.01); *F15B 20/002* (2013.01); *F15B 2011/0243* (2013.01); *F15B 2211/20515* (2013.01); *F15B 2211/20561* (2013.01); *F15B 2211/27* (2013.01); *F15B 2211/3058* (2013.01); *F15B 2211/31529* (2013.01); *F15B 2211/32* (2013.01); *F15B 2211/327* (2013.01); *F15B 2211/625* (2013.01); *F15B 2211/6658* (2013.01); *F15B 2211/7054* (2013.01)

(56) References Cited

U.S. PATENT DOCUMENTS

| | | | |
|---|---|---|---|
| 5,097,857 A | 3/1992 | Mayhew | |
| 5,144,801 A * | 9/1992 | Scanderbeg | F15B 15/18 60/475 |
| 5,181,380 A | 1/1993 | Favre et al. | |
| 5,338,161 A | 8/1994 | Eley | |
| 5,515,829 A * | 5/1996 | Wear | F02B 75/22 123/446 |
| 5,700,136 A | 12/1997 | Sturman | |
| 6,358,018 B1 | 3/2002 | Alm | |
| 6,625,982 B2 | 9/2003 | Van Den Bossche et al. | |
| 7,191,593 B1 | 3/2007 | Ho | |
| 7,434,395 B2 * | 10/2008 | He | F15B 15/18 60/475 |
| 8,434,301 B2 | 5/2013 | Fukui | |
| 8,776,513 B2 * | 7/2014 | Nishioka | A01D 34/74 60/478 |
| 8,840,118 B1 | 9/2014 | Giovanardi et al. | |
| 8,935,015 B2 | 1/2015 | Olsoe et al. | |
| 2001/0033799 A1 | 10/2001 | Staton et al. | |
| 2003/0000765 A1 | 1/2003 | Spadafora | |
| 2008/0010984 A1 | 1/2008 | Arbel et al. | |
| 2008/0022672 A1 | 1/2008 | He | |
| 2013/0067898 A1 | 3/2013 | Onishi et al. | |
| 2015/0308463 A1 | 10/2015 | Gomm et al. | |
| 2016/0076558 A1 | 3/2016 | Gomm et al. | |
| 2017/0002844 A1 | 1/2017 | Lesage et al. | |
| 2017/0356476 A1 | 12/2017 | Lesage et al. | |
| 2018/0023271 A1 | 1/2018 | Quan et al. | |

FOREIGN PATENT DOCUMENTS

| | | |
|---|---|---|
| EP | 1806506 A2 | 7/2007 |
| EP | 1878598 A1 | 1/2008 |
| EP | 2322808 A2 | 5/2011 |
| EP | 2692636 A1 | 2/2014 |
| JP | 2011089535 A | 5/2011 |
| WO | 9811357 A | 3/1998 |
| WO | 2014176252 A1 | 10/2014 |

OTHER PUBLICATIONS

European Search Report for Application No. 15306480.3-1608 dated Feb. 19, 2016; 7 pages.

Extended European Search Report for International Application No. 16305707.8 dated Nov. 28, 2016, 8 pages.

JP Office Action for Application No. JP 2016-117540, dated Sep. 10, 2019, 5 pages.

* cited by examiner

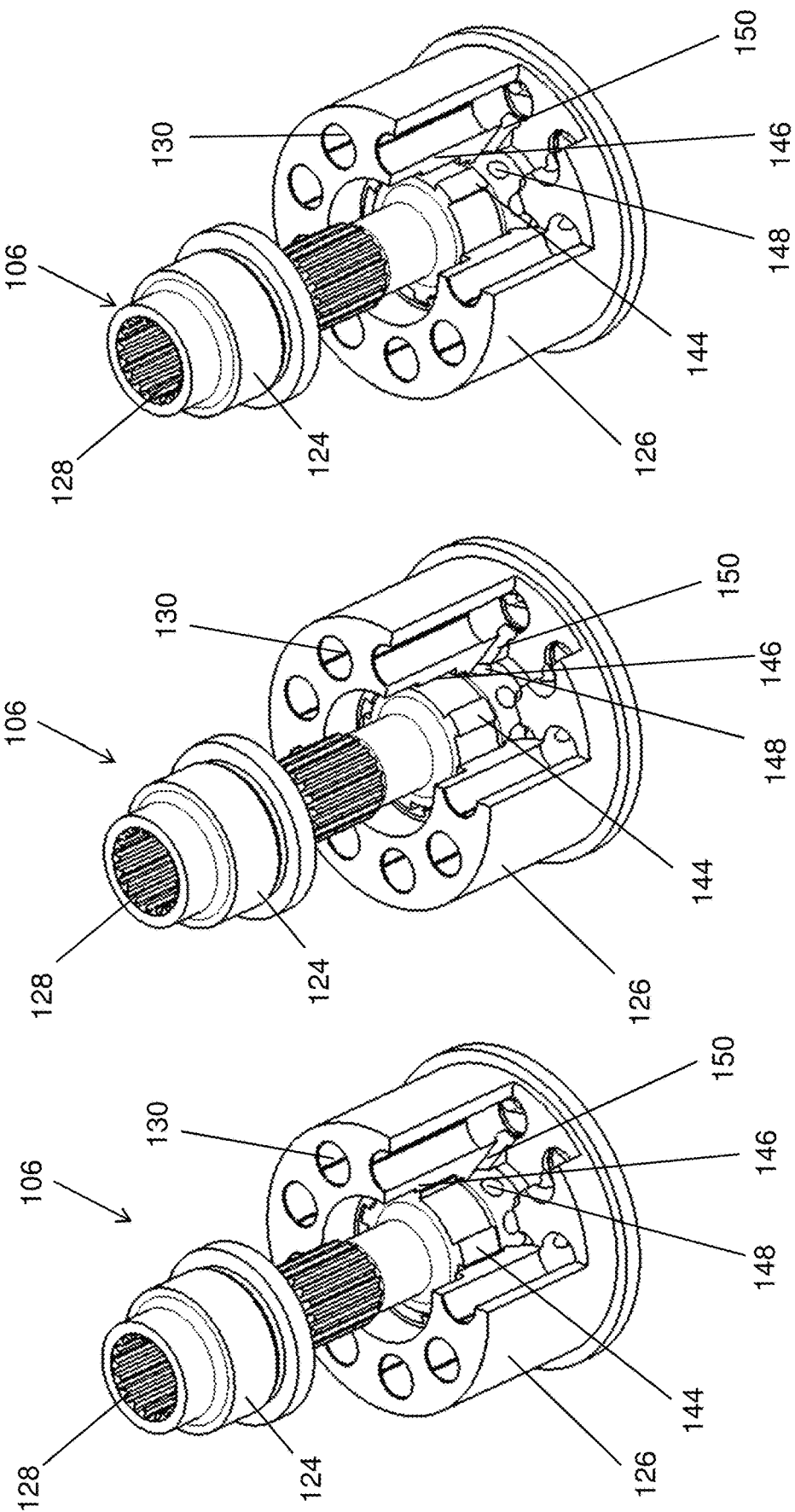

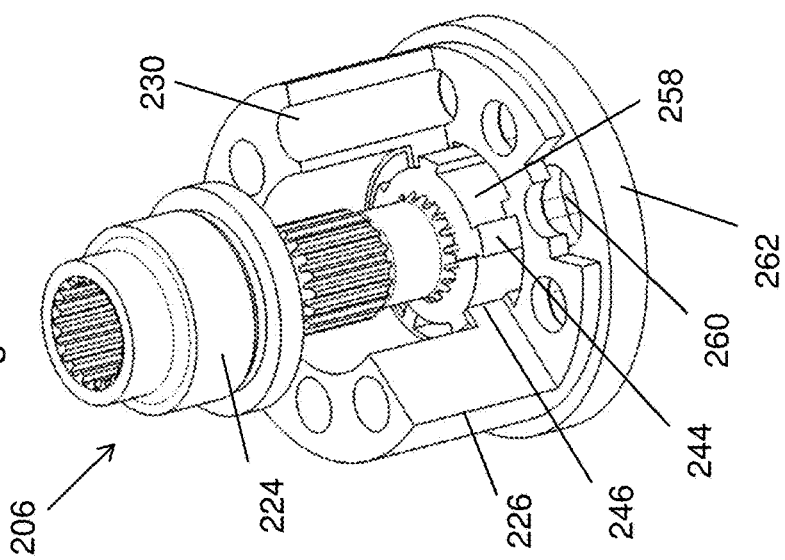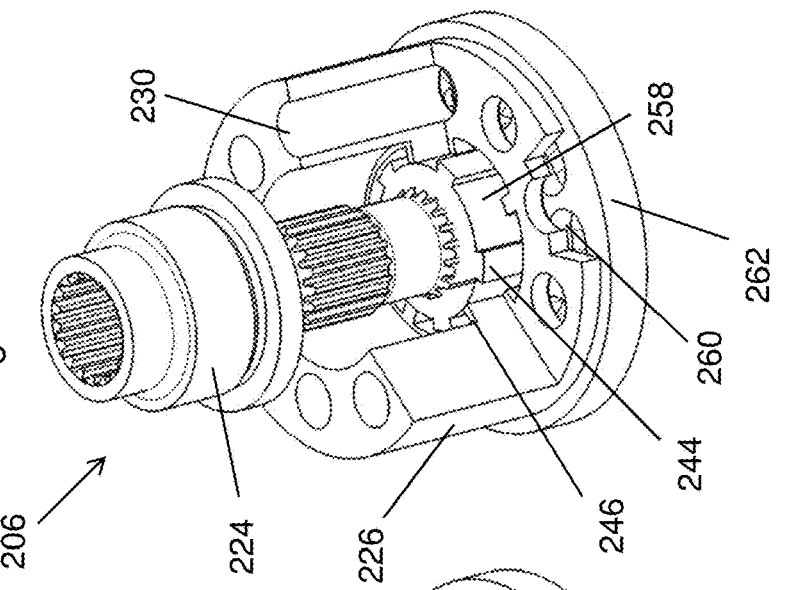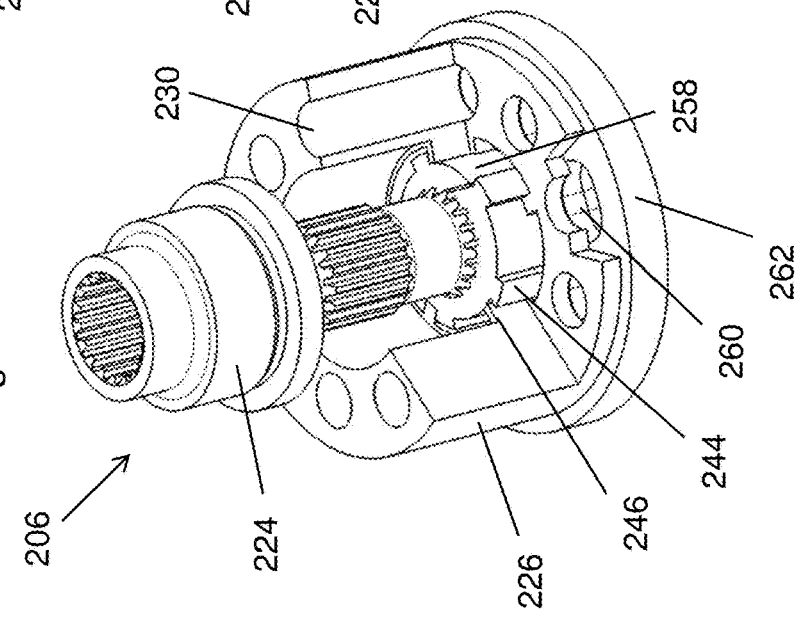

ELECTRO HYDROSTATIC ACTUATORS

FOREIGN PRIORITY

This application claims priority to European Patent Application No. 15306038.9 filed Jun. 30, 2015, the entire contents of which is incorporated herein by reference.

TECHNICAL FIELD

The present disclosure relates to electro hydrostatic actuators and in particular to those comprising an electrically powered motor-pump assembly to generate pressure and flow control for the hydraulic actuator.

BACKGROUND

An electro hydrostatic actuator (EHA) is a self-contained actuator run and controlled by its own electrically powered motor-pump assembly, thereby eliminating the need for a separate hydraulic pump. In aerospace applications, EHAs are typically a fly-by-wire (FBW) device that is operated by control electronics. The hydraulic actuator of an EHA may be used to move aerodynamic surfaces such as a flap on an aircraft wing. EHAs may replace conventional hydraulic actuator systems in an aircraft for various operations, including e.g. landing gear retraction/extension, steering, braking, and fluid control.

Especially when EHAs are used to control components of aircraft operation, it is important to provide redundancy in the event of electrical power generation failure or control path electronics failure. It has previously been proposed, for example as seen in US 2013/0067898, for an EHA to comprise a failsafe hydraulic circuit that includes additional hydraulic oil paths allowing communication between the jack chambers of the hydraulic actuator and a solenoid "mode" valve that can be switched to connect the additional hydraulic oil paths and allow for a bypass flow of hydraulic oil outside the electrically-powered hydraulic pump, e.g. in an emergency state of power loss. In such an emergency state, the hydraulic actuator is still able to provide a damping force to its aerodynamic surface. This damping effect is switched on or off by the additional solenoid valve in the hydraulic circuit.

The present disclosure seeks to provide improvements in an electro hydrostatic actuator.

SUMMARY

According to an aspect of this disclosure there is provided an electro hydrostatic actuator (EHA) comprising: a hydraulic pump driven by an electric motor to supply hydraulic fluid to a hydraulic actuator. The pump includes an inlet and an outlet for the hydraulic fluid and an active flow path arranged therebetween such that, in an active mode of operation when the pump is driven by the electric motor, hydraulic fluid is actively drawn in through the inlet and exhausted out through the outlet. The pump further comprising a bypass flow path arranged to open between the inlet and outlet such that, in a damping mode of operation when the pump is not driven by the electric motor, hydraulic fluid is able to pass through the pump along the bypass flow path between the inlet and outlet.

In the active mode of operation, when the pump is driven by the electric motor, the EHA operates normally with the hydraulic pump generating pressure and flow control for the hydraulic actuator. When the pump is not driven by the electric motor, e.g. in case of electrical power failure or pump control electronics failure, the bypass flow path allows hydraulic fluid to pass through the pump and achieve a damping effect for the hydraulic actuator. By opening a bypass flow path between the inlet and outlet of the pump, a damping mode of operation is integrated into the pump rather than requiring an additional solenoid "mode" valve in the hydraulic circuit between the pump and the actuator. This reduces the number of components in the EHA and associated costs, as well as allowing an envelope reduction for the device. For example, the EHA may no longer require a solenoid mode valve, associated power supply, and anti-cavitation valves. Furthermore, such an EHA may provide improved reliability due to the integration of damping control into the hydraulic pump-motor assembly.

Although the pump is described as having a discernible inlet and outlet at any point in time, it will be appreciated that the physical port(s) providing the inlet and outlet may change in time. A pump as described typically comprises multiple ports in fluid communication with the hydraulic actuator; at any one time one or more of these ports may act as an inlet and one or more of these ports may act as an outlet. Such ports, i.e. the inlet and outlet, are usually provided by a port plate attached to the base of the pump. For a rotary pump, when the rotational direction of the motor is reversed, the pump operates to supply hydraulic fluid in the opposite direction, and the inlet and outlet may swap over. Additionally, although only an inlet and outlet is disclosed in relation to the active flow path and bypass flow path, it is possible that the pump may comprise one or more further inlets and/or outlets e.g. providing other flow paths. For example, in the case of a dissymmetrical pump, there may be an additional outlet to facilitate fluid flow to an accumulator.

The bypass flow path in the pump may be arranged to selectively open between the inlet and outlet whenever the pump is not driven by the electric motor. Of course the bypass flow path may take the form of a flow path that is created only when the pump is not driven by the electric motor, or the bypass flow path may take the form of a flow path that always exists in the pump but is only unblocked, uncovered, accessible, etc. when the pump is not driven by the electric motor. Control electronics could provide for opening of the bypass flow path when the electric motor is turned off or there is a power supply failure. However this is likely to require a backup power supply for such control electronics. It is preferable that the bypass flow path is arranged to automatically open when the pump is not driven by the electric motor. This not only eliminates the need for a solenoid valve outside the pump but also a failsafe power supply to control the damping mode of operation. Rather, the damping mode of operation is automatically provided by the pump as a default mode whenever the electric motor is not active.

The pump may comprise any suitable arrangement for automatically opening the bypass flow path when the pump is not driven by the electric motor. For example, a latch could act to hold the bypass flow path closed, such a latch being released whenever power is removed from the electric motor. In preferred examples the pump comprises a resilient member arranged to automatically open the bypass flow path when the pump is not driven by the electric motor. Such a resilient member may provide a resilient bias that tends to open the bypass flow path through the pump. For example, the resilient bias may be provided by a spring device. The resilient bias may be overcome when the pump is driven by the motor, for example due to movement of the pump or other operation of the motor. In a preferred set of examples where the hydraulic pump is a rotary pump comprising a pump barrel driven to rotate by a motor shaft, the resilient member may be opposed when a torque is applied by the motor shaft, i.e. whenever the pump is driven by the motor. In such examples, the resilient member may be arranged between the pump barrel and the motor shaft so as to open the bypass flow path as a fluid flow path through or around the motor shaft, as will be explained further below. Accordingly the pump may provide the damping mode of operation as a default mode of operation whenever there is no torque applied, e.g. due to a failure in the power supply to the electric motor or failure in the control electronics.

It will be appreciated that the rate of hydraulic fluid flow through the pump along the bypass flow path can determine the damping effect on the hydraulic actuator. In prior art arrangements that use a solenoid valve outside the pump to provide a damping mode, the damping factor is an absolute value set by the flow resistance of the valve. Activating such a valve merely turns the damping factor on/off. In examples of the present disclosure, on the other hand, the bypass flow path through the pump may be adjustable to provide a desired damping factor for the hydraulic actuator. It may be possible to dynamically adjust the bypass flow path for example by adjusting the degree to which the bypass flow path is opened in situ. However, in various examples the bypass flow path through the pump may be adjusted to provide a desired damping factor during manufacture or installation of the EHA.

Preferably the size of the bypass flow path is adjusted during manufacture and/or installation of the pump to provide a desired damping factor for the hydraulic actuator, for example by choosing the cross section of the bypass flow path. This may be achieved, for example, by selecting or changing one or more components of the pump that contribute to the bypass flow path. The components may be chosen depending on the desired damping factor for a particular use of the hydraulic actuator. For instance, in an example where the hydraulic actuator is to act on an aerodynamic surface (such as wing flap) in an aircraft then the damping factor may be chosen to allow hydraulic fluid to pass along the bypass flow path through the pump so that movement of the surface is damped even if the motor has failed. By adjusting the size of the bypass flow path, the damping factor can be tailored to a particular application. Note that the hydraulic fluid is not pressurised or energized by the pump in the damping mode of operation and flow along the bypass path is driven solely by movement of the hydraulic actuator. Some exemplary ways to achieve modification of the damping factor will be discussed in more detail further below.

It may be desirable, as a safety feature, to sense whether the EHA has properly entered the damping mode or whether the damping mode is available. For example, if it is detected that the damping mode of operation is not available e.g. due to a blockage in the bypass flow path in the pump, then an alert may be triggered. The alert could seek for maintenance to be carried out on the EHA or raise an emergency state. In at least some examples it is preferable that the EHA comprises a sensor arranged to detect whether the bypass flow path is open between the inlet and outlet of the pump. Such a sensor may be arranged to directly detect whether the bypass flow path is open, for example by measuring hydraulic fluid pressure and actuator velocity. However it may be easier for the sensor to indirectly detect whether the bypass flow path is open, for example by measuring a property of the pump. In examples where the hydraulic pump is a rotary pump comprising a pump barrel driven to rotate by a motor shaft, the sensor may detect the position of the pump barrel relative to the motor shaft or the torque applied by the motor shaft. This will be explained in further detail below in relation to certain examples.

As is mentioned above, in various examples the hydraulic pump may take the form of a rotary pump. There are various types of rotary pump that are suitable for use in EHA applications, these have associated advantages and disadvantages. Types of suitable pump may include: rotary piston, bent axis, radial piston, and gear pumps. There will now be described a preferred set of examples wherein the hydraulic pump is a rotary piston pump. The rotary piston pump preferably comprises a pump barrel driven to rotate by a motor shaft, and a plurality of axial cylinders in the pump barrel arranged to receive reciprocating pistons. In such a pump, the inlet has a fluid connection with the axial cylinders in one half of the pump barrel and the outlet has a fluid connection with the axial cylinders in the other half of the pump barrel.

In one set of examples, the rotary piston pump is an axial piston pump comprising an angled cam surface (e.g. a swash plate) that is fixed relative to the motor shaft to cause the pistons to progressively reciprocate in the axial cylinders as the barrel rotates. When the pump is driven by the electric motor, hydraulic fluid is drawn through the inlet by the piston strokes on one side of the pump barrel and pushed out of the outlet by the piston strokes on the other side of the pump barrel. According to the present disclosure, the pump additionally includes a bypass flow path that allows hydraulic fluid to pass through the pump between the inlet and outlet when the pump is idle i.e. not driven by the motor so that the pistons do not reciprocate in the axial cylinders.

Preferably the bypass flow path is arranged to pass through or around the motor shaft between the inlet connected to the axial cylinders in one half of the pump barrel and the outlet connected to the axial cylinders in the other half of the pump barrel (or vice versa). The bypass flow path through or around the motor shaft may be connected to the axial cylinders in the pump barrel but does not involve hydraulic fluid passing axially along the cylinders i.e. the bypass flow path does not encounter the pistons. It will be appreciated that this is entirely different to a normal piston pump, wherein fluid can only pass through the cylinders in the pump barrel between the inlet and the outlet (for a given rotation direction) when the pistons are driven by the motor.

In a preferred set of examples the bypass flow path comprises one or more bypass ports in the motor shaft that provide a fluid path through the motor shaft between the inlet connected to axial cylinders in one half of the pump barrel and the outlet connected to axial cylinders in the other half of the pump barrel. In such examples, it is preferable that the bypass flow path comprises one or more connecting ports in the pump barrel that provide a fluid path from the inlet and/or the outlet to the one or more bypass ports in the motor shaft.

The one or more connecting ports may comprise a connecting port in the pump barrel in fluid connection with each of the axial cylinders in the pump barrel. In other words, the pump barrel may comprise multiple connecting ports and at least one connecting port for each of the axial cylinders. The connecting ports may be generally radial ports passing between each of the axial cylinders in the pump barrel and a corresponding bypass port in the motor shaft. Such radial ports may be angled or slanted e.g. to assist with ease of machining. In other words, the motor shaft may comprise multiple bypass ports and at least one bypass port for each of the connecting ports. Alignment of the connecting ports with the bypass ports can determine when the bypass flow path is open.

In an alternative preferred set of examples the bypass flow path comprises one or more bypass ports in a bypass port plate which is positioned at the base of the pump barrel and driven to rotate by the motor shaft, for example by a collar attached to the port plate. When the bypass port plate and barrel are driven together by the motor shaft, the bypass ports are aligned with the cylinders in the pump barrel to provide the active flow path between the inlet and outlet for hydraulic fluid. When the motor shaft is not driven, the bypass port plate may move circumferentially relative to the pump barrel to align the bypass ports such that the ports provide a fluid connection between adjacent cylinders. This fluid connection from one adjacent cylinder to the next provides a bypass flow path between the inlet connected to the axial cylinders in one half of the pump barrel and the outlet connected to the axial cylinders in the other half of the pump barrel. Fluid is able to pass into the pump barrel through the inlet and move generally circumferentially, rather than radially, between neighbouring cylinders via the bypass ports, which are aligned such that they each overlap multiple cylinders. In such examples it is preferable that each cylinder has a corresponding bypass port on the bypass port plate and the cylinders and bypass ports are proportioned and spaced such that, in the damping mode, each bypass port extends between two adjacent cylinders. Such an arrangement is particularly advantageous as the bypass ports do not need to be machined into the barrel. Instead, the barrel and bypass port plate can be manufactured as two separate parts with the bypass ports being machined in the bypass port plate to provide the bypass flow path. A conventional port plate may also be present to link the axial cylinders in one half of the pump barrel to provide the inlet and to link the axial cylinders in the other half of the pump barrel to provide the outlet, e.g. beneath the bypass port plate at the base of the barrel.

In a first set of examples, the one or more bypass ports in the motor shaft and the one or more connecting ports in the pump barrel are not aligned in the active mode of operation, and the one or more bypass ports in the motor shaft and the one or more connecting ports in the pump barrel are aligned in the damping mode of operation. This provides a bypass flow path through the motor shaft in the damping mode. In a second set of examples, the one or more bypass ports in the bypass port plate are each aligned with one of the axial cylinders in the pump barrel in the active mode of operation when the pump is driven, and wherein the one or more bypass ports in the bypass port plate are each aligned with two adjacent axial cylinders in the pump barrel in the damping mode of operation when the pump is not driven. This provides a bypass flow path around the motor shaft in the damping mode. Alignment may depend on whether or not the pump barrel is driven to rotate by the motor shaft.

In a conventional rotary piston pump the pump barrel is fixedly mounted to the motor shaft, for example by interconnecting splines. In examples of the present disclosure, on the other hand, the pump barrel is not fixedly mounted to the motor shaft. In preferred examples the pump barrel is mounted on the motor shaft by a driving arrangement allowing for a degree of relative rotation. In such examples, the usual interconnecting splines may be replaced by an arrangement of circumferential notches and gaps.

In a first set of examples, the pump barrel comprises an inner circumferential surface and the motor shaft comprises an outer circumferential surface, the inner and outer circumferential surfaces being drivingly connected by at least one engagement tooth on one of the inner and outer circumferential surfaces and at least one corresponding notch on the other of the inner and outer circumferential surfaces, arranged such that there is a circumferential gap therebetween allowing for relative rotation between the pump barrel and the motor shaft. Such relative rotation between the pump barrel and the motor shaft can move the one or more a bypass ports in the motor shaft and the one or more connecting ports in the pump barrel out of alignment in the active mode of operation. When the pump is driven, a torque is applied by the motor shaft that causes the relative rotation.

In a second set of examples, the pump barrel comprises an inner circumferential surface and a collar mounted on the bypass port plate comprises an outer circumferential surface, the inner and outer circumferential surfaces being drivingly connected by at least one engagement tooth on one of the inner and outer circumferential surfaces and at least one corresponding notch on the other of the inner and outer circumferential surfaces, arranged such that there is a circumferential gap therebetween allowing for relative rotation between the pump barrel and the bypass port plate. Such relative rotation between the pump barrel and the bypass port plate can move the one or more a bypass ports in the bypass port plate out of alignment with the axial cylinders in the damping mode of operation. When the pump is not driven, there is no longer a torque applied by the motor shaft that causes the bypass port plate to be aligned with the pump barrel.

It has already been mentioned above that a resilient member may be arranged between the pump barrel and the motor shaft so as to open the bypass flow path. In a first set of examples, the pump comprises a resilient member arranged to apply a resilient force, preferably a torque, that aligns the one or more bypass ports in the motor shaft and the one or more connecting ports in the pump barrel in the damping mode of operation. In a second set of examples, the pump comprises a resilient member arranged to apply a resilient force, preferably a torque, that aligns the one or more bypass ports in the bypass port plate between adjacent cylinders in the barrel. Such a resilient member, for example a spring device, may thereby act to automatically open the bypass flow path when the pump is not driven. In examples as described above, relative rotation between the pump barrel and the motor shaft or bypass port plate may overcome the resilient force in the active mode of operation when the pump is driven. This means that the bypass flow path is not open when the pump is driven.

It has already been mentioned that the size of the bypass flow path through the pump may be adjusted to provide a desired damping factor. In one set of examples, a suitable throttling member may be inserted into the bypass flow path passing through the motor shaft. For example, the one or more bypass ports in the motor shaft may be connected to a central chamber with one or more throttling members fitted in the central chamber. For example, a throttling member, such as an axial pin, may be fitted in the central chamber during installation of the EHA. The dimensions of the throttling member, e.g. diameter and/or length, may be chosen relative to the dimensions of the chamber to provide a desired throttling effect and hence a desired degree of damping. This may be achieved by appropriate machining of the throttling member(s). Alternatively, or in addition, one or more throttling members of appropriate size may be chosen and fitted into the chamber. As discussed above, this can ensure that the EHA provides an appropriate damping factor for the hydraulic actuator and its intended use.

In an alternative set of examples, the size and/or spacing of the one or more bypass ports provided in the bypass port plate is specifically chosen to provide a desired degree of damping. For example, the one or more bypass ports in the bypass port plate could be machined to a specific size to provide the desired degree of damping. Alternatively, or additionally, inserts may be positioned within the one or more bypass ports to restrict their size and hence restrict the cross sectional area of the bypass flow path.

It has already been mentioned that the EHA may include a sensor arranged to detect whether the bypass flow path is open between the inlet and outlet of the pump. In examples as described above, such a sensor may indirectly detect when the bypass flow path is open by determining alignment of the one or more bypass ports in the motor shaft or bypass port plate, e.g. depending on relative rotation between the pump barrel and the motor shaft or bypass port plate. The EHA may therefore comprise a rotary sensor arranged to detect relative rotation between the pump barrel and the motor shaft or bypass port plate.

In various examples of the present disclosure, the hydraulic actuator (e.g. a piston reciprocating in a cylinder) may be arranged to generate displacement for an aircraft component, for example an aerodynamic surface such as a wing flap. The hydraulic actuator may take the form of a linear actuator comprising a ram moving axially in a cylinder and/or a rotary actuator.

The present disclosure extends to an aircraft component controlled by an electro hydrostatic actuator (EHA) as described hereinabove. The hydraulic actuator of the EHA may be operatively connected to the aircraft component.

According to another aspect of this disclosure there is provided a method of controlling and damping a hydraulic actuator. The method includes: powering an electric motor to drive a hydraulic pump to supply hydraulic fluid to the hydraulic actuator in an active mode of operation; and opening a bypass flow path through the hydraulic pump when the pump is not driven by the electric motor in a damping mode of operation.

Any of the features described hereinabove may be applied to such a method.

BRIEF DESCRIPTION OF DRAWINGS

One or more non-limiting examples will now be described with reference to the accompanying drawings, in which:

FIG. 7 shows an example of a pump with positive torque applied according to the present disclosure.

FIG. 8 shows the pump of FIG. 7 with no torque applied.

FIG. 9 shows the pump of FIG. 7 with negative torque applied.

FIG. 16 shows another example of a pump with positive torque applied according to the present disclosure.

FIG. 17 shows the pump of FIG. 16 with no torque applied.

FIG. 18 shows the pump of FIG. 16 with negative torque applied.

DETAILED DESCRIPTION OF THE INVENTION

Figure 1:
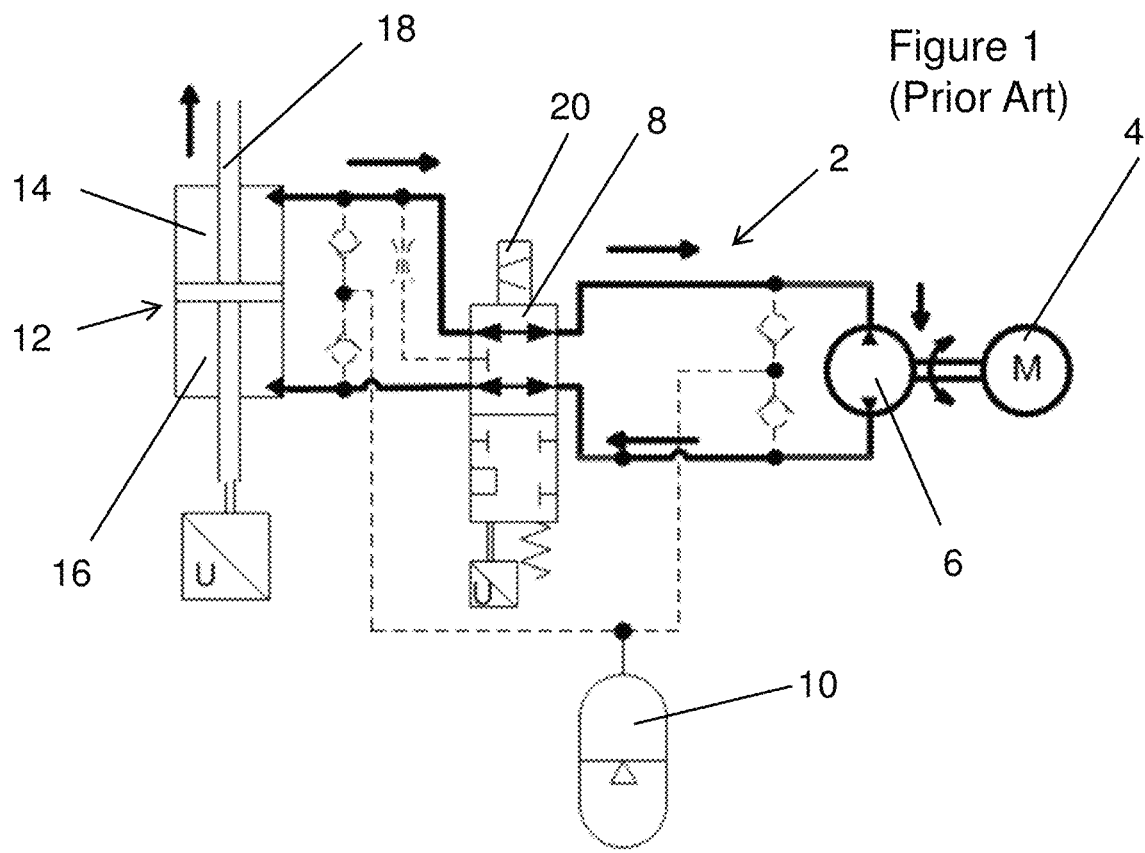
FIG. 1 shows a fluid flow diagram for an EHA in an active mode according to the prior art.
Figure 2:
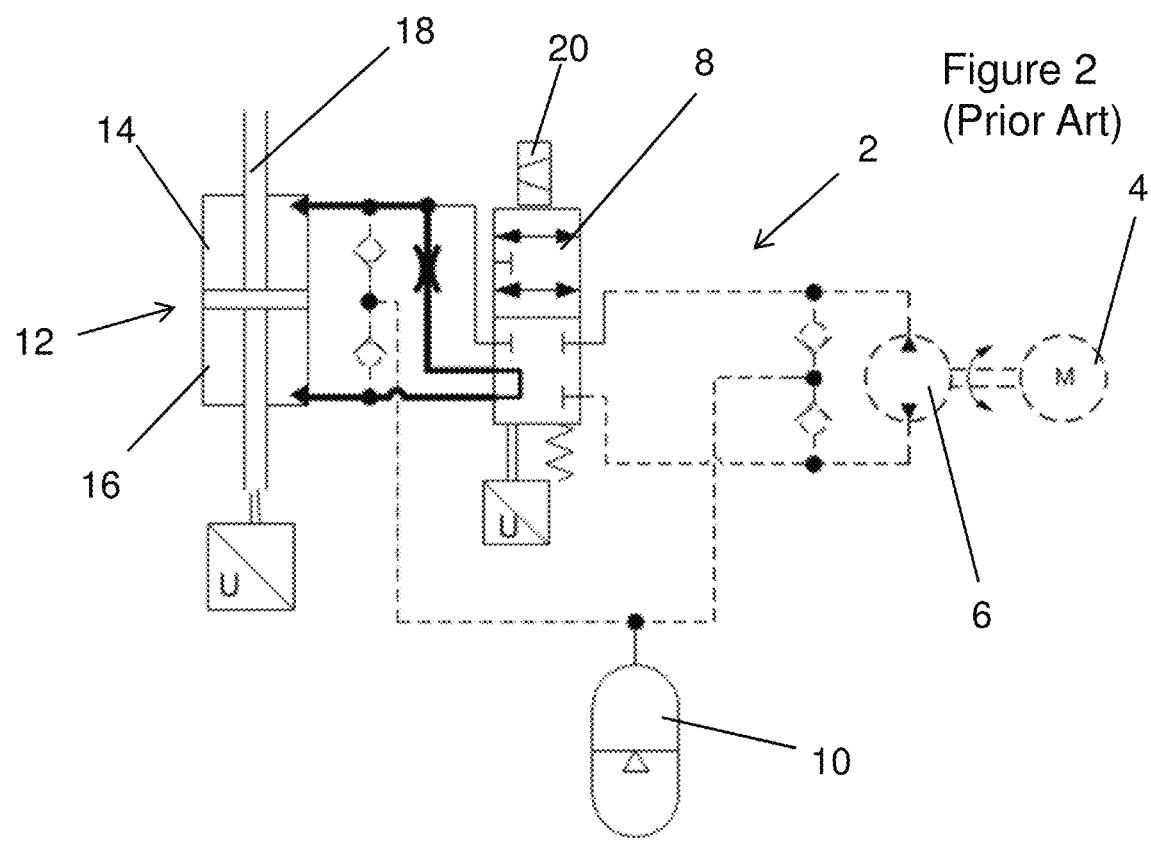
FIG. 2 shows a fluid flow diagram for an EHA in a damping mode according to the prior art.

FIGS. 1 and 2 show a fluid flow diagram for an electro hydrostatic actuator (EHA) 2 according to the prior art. FIG. 1 shows a reversible electric motor 4, a hydraulic pump 6, a mode valve 8, an accumulator 10 and a hydraulic actuator 12. The hydraulic actuator 12 shown in FIG. 1 consists of two separate chambers 14, 16 and an actuator ram 18. The mode valve 8 can be operated by a solenoid 20 and has two modes of operation which is typically on or off. The ram 18 is typically attached to a component on the aircraft such as an aerodynamic surface. The EHA typically has two modes of operation: an Electric Active Mode (EAM) and a damping mode. FIG. 1 shows the EHA in EAM. During EAM the motor 4 acts to drive the pump 6. This can be in either direction as the pump 6 is reversible. As the pump 6 is driven it causes hydraulic fluid to flow around a circuit as shown by the bold lines and the arrows in FIG. 1. This results in fluid being directed into one of the chambers 14, 16 of the hydraulic actuator 12. As fluid enters one of the chambers 14, 16 and leaves the other chamber 14, 16 this causes the ram 18 to move within the chambers 14, 16 which acts to move the aerodynamic surface it is attached to.

FIG. 2 shows a fluid flow diagram for the EHA 2 in damping mode. The damping mode can be initiated in circumstances where there is an electrical power generation failure or electronic control path failure. The solenoid 20 is capable of activating the mode valve 8 which alters the fluid flow within the system. The damping mode introduces a damping effect to the ram 18. This may be critical for certain applications of an EHA for example when in use on an aircraft. The damping mode is also the default mode when the ram 18 is not required to be engaged i.e. the pump 6 is not driven by the motor 4. The purpose of the damping mode is to provide a damping force to the ram 18 which may be connected to an aerodynamic surface, this prevents uncontrolled motion when external aerodynamic forces are applied to the surface. In the damping mode, fluid is free to flow between one chamber 14, 16 through the mode valve 8 and to the other chamber 14, 16 of the hydraulic actuator 12. The free flow of fluid between the two chambers 14, 16 acts to damp the motion of the ram 18. During the damping mode the fluid completely bypasses the pump 6 and only travels through the mode valve 8. The damping effect on the ram 18 is fixed by the mode valve 8.

Figure 3:
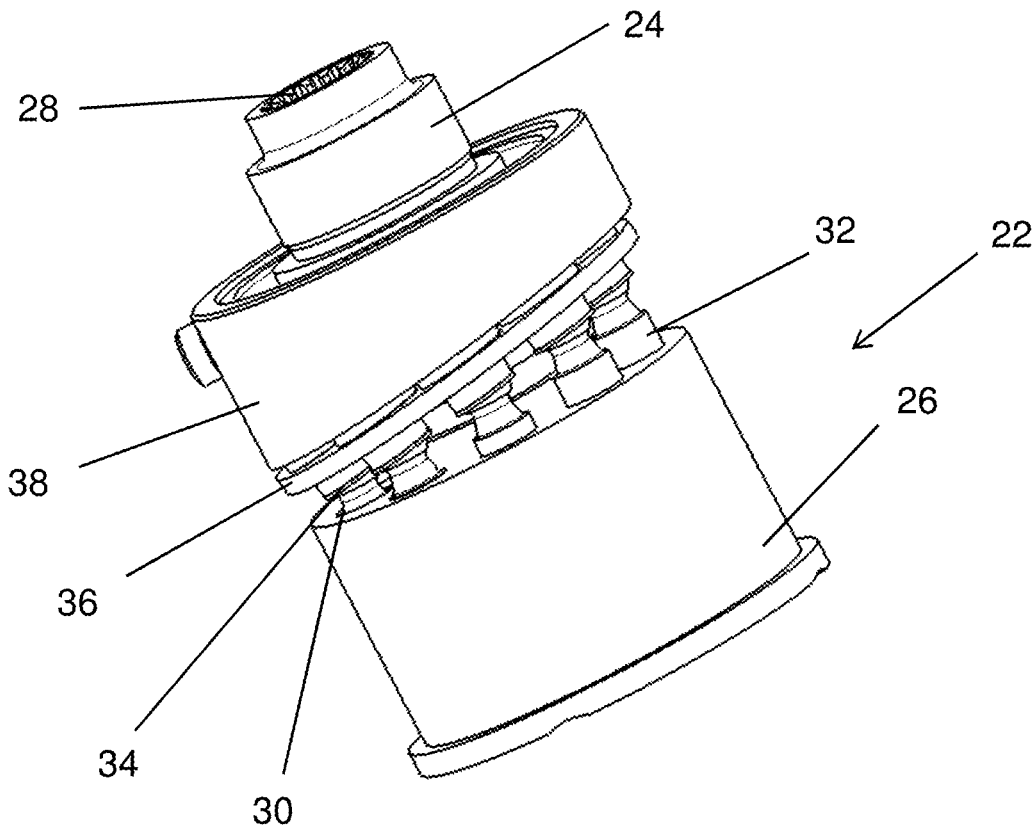
FIG. 3 shows a typical rotary piston pump.

FIG. 3 shows a typical rotary piston pump 22 operated by a motor shaft 24. The motor shaft 24 drives a pump barrel 26 by the connection of splines on the circumference of the motor shaft (not shown) and corresponding splines (not shown) on the internal surface of the pump barrel 26. The splines typically have a one to one correspondence and thus there is minimal relative rotation between the motor shaft 24 and the pump barrel 26. Internal splines 28 on the rear end of the motor shaft 24 provide for connection between the motor shaft 24 and the motor itself (not shown). The pump 22 is comprised of a pump barrel 26 with axial cylinders 30 extending therethrough. The spacing of the axial cylinders 30 is equiangular with respect to the centre of the pump barrel 26. Pistons 32 are present within the axial cylinders 30 and are free to reciprocate within the cylinders 30. The pistons 32 are linked by shoes 34 to a rotating plate 36 guided by a cam plate 38. The cam plate 38 is orientated at an angle such that, at any moment in time, at one side the pistons 32 are fully inserted in the cylinders 30 and at the other side they are drawn out of the cylinders 30.

During typical operation of the pump 22 the motor shaft 28, driven by a motor, drives the pump barrel 26 causing it to rotate. As the pump barrel 26 rotates the pistons 32 reciprocate within the axial cylinders 30 causing fluid to be drawn into the pump barrel 26 on one side and expelled on the opposite side of the barrel 26. Although the cam plate 38 is shown at a fixed angle, it may be adjustable to control the amount of fluid that is being displaced from the pump.

Figure 4:
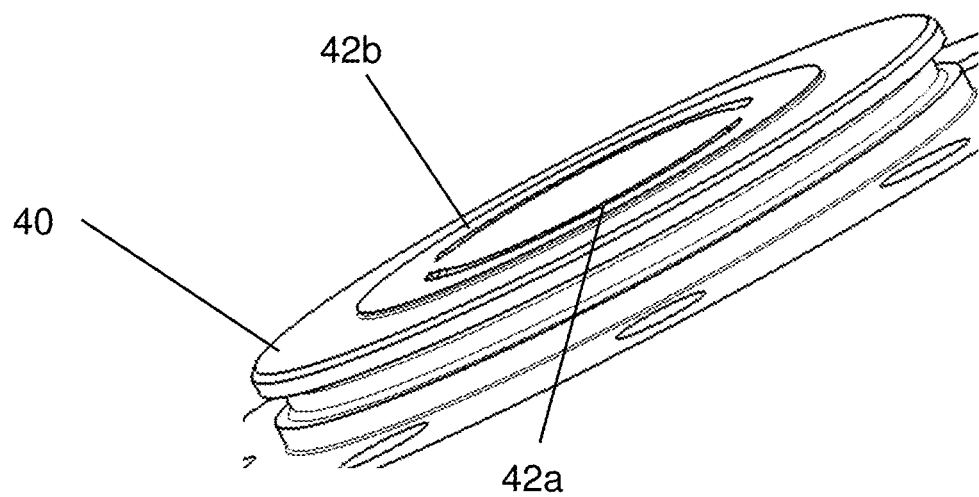
FIG. 4 shows the port plate of a typical rotary piston pump.

FIG. 4 shows a view of the underside of the pump 22 and shows in detail the port plate 40 which is attached to the base of the pump barrel 26. On the port plate 40 are two ports 42 which provide access to the cylinders 30 of the pump barrel 26. The ports 42 are semi-circular and follow the same arc as the circumferential positioning of the cylinders 30 in the pump barrel 26. The purpose of the provision of two ports 42 with a spacing between them is to prevent fluid being drawn in from the expulsion side of the pump. The gap between the ports 42 effectively corresponds to the points of change in gradient on the cam plate 38 from a positive to negative gradient or negative to positive gradient. One port 42a acts as an inlet to the pump 22 while the other port 42b acts as an outlet, or vice versa.

Figure 5:
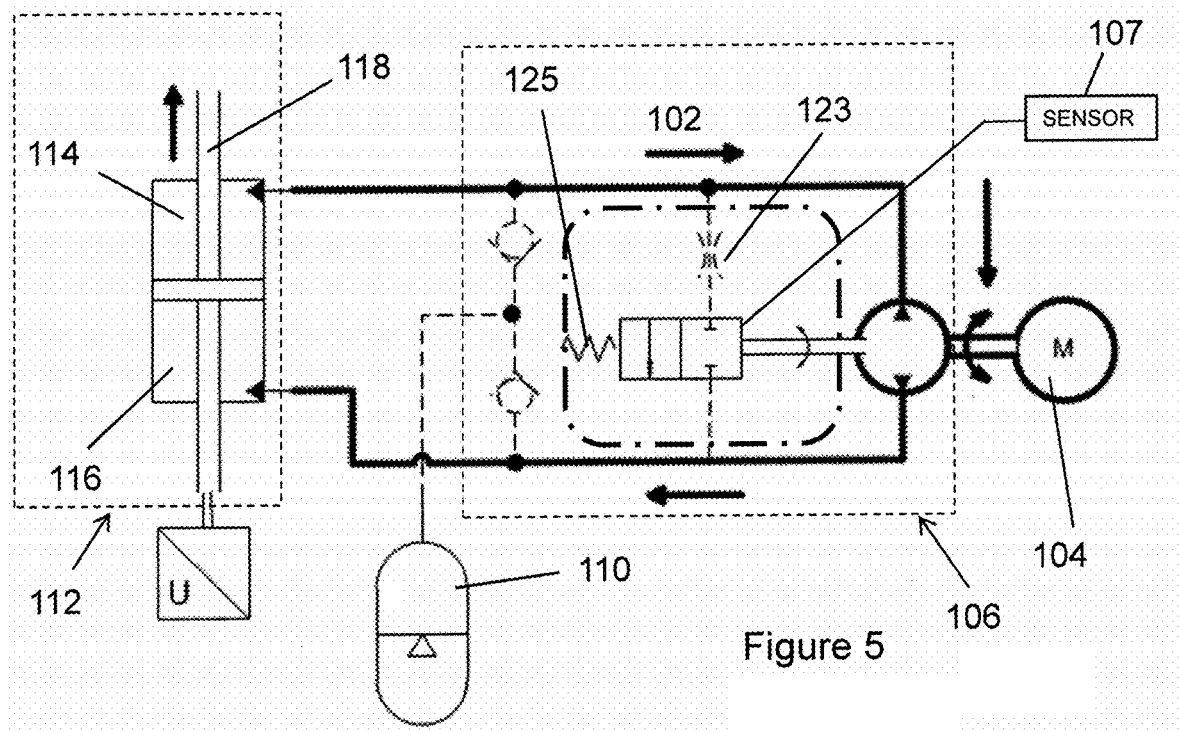
FIG. 5 shows a fluid flow diagram for an EHA in an active mode according to the present disclosure.
Figure 6:
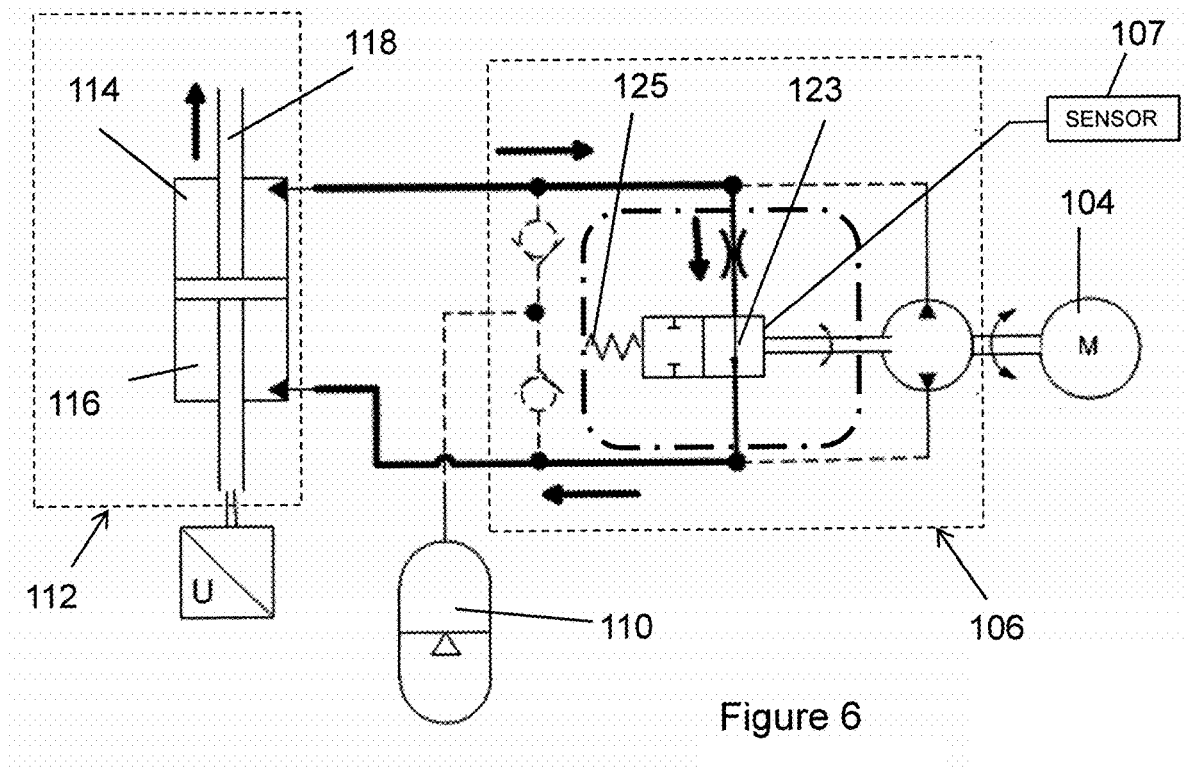
FIG. 6 shows a fluid flow diagram for an EHA in a damping mode according to the present disclosure.

FIGS. 5 and 6 show exemplary fluid flow diagrams according to the present disclosure. There is seen an electric motor 104, a hydraulic pump 106, an accumulator 110 and a hydraulic actuator 112. Instead of the damping mode being achieved by having a mode valve separate to the pump, it is now provided by a bypass flow path 123 incorporated internally within the pump 106. FIG. 5 shows a motor 104 which is operatively connected to a pump 106. Within the pump 106 there is an incorporated bypass flow path 123 (dotted line). The bypass flow path 123 is opened by a spring 125. FIG. 5 shows the pump during typical operation. During active mode the motor 104 rotates to operate the pump 106 which drives fluid around the circuit 102 through the pump 106. The fluid can be driven to/from the chambers 114, 116 of the hydraulic actuator 112 via the fluid path shown in bold and with corresponding arrows.

FIG. 6 shows the pump 106 operating in damping mode. In damping mode the motor 104 is no longer active and as a result the pump 106 is no longer driven. The bypass flow path 123 (solid line) is opened by the spring 125. In this damping mode, fluid in each of the hydraulic actuator's chambers 114, 116 is free to flow along the bypass flow path 123 which is through the pump 106 to the other chamber 114, 116. This would not be possible in a typical piston pump as there is no means for the fluid to transfer from the cylinders on one side of the pump to the other side. This is possible with the present disclosure and can be seen in the following Figures.

FIGS. 7-9 show a pump 106 in accordance with an example of the present disclosure. FIG. 7 shows the motor shaft 124 and pump barrel 126 when positive torque is applied to the pump barrel 126. The motor shaft 124 is positioned within the core of the pump barrel 126 and has circumferential notches 144 which engage with corresponding notches 146 on an inner surface of the pump barrel 126. The notches 144 on the motor shaft 124 are spaced apart such that there is a certain degree of relative rotation between the motor shaft 124 and the pump barrel 126 before they become engaged. Also seen in this Figure are bypass ports 148 in the motor shaft 124 and connecting ports 150 in the pump barrel 126. The connecting ports 150 are linked directly to the cylinders 130 in the pump barrel 126 and there is a corresponding connecting port 150 for each cylinder 130. The connecting ports 150 are positioned at the lower end of the cylinder 130 and are slanted upwards towards the bypass ports 148. These ports 148, 150 allow for the flow of hydraulic fluid through the bypass path 123 in the damping mode illustrated by FIG. 6.

FIG. 7 shows positive torque being applied to the pump barrel 126 by the motor shaft 124. In this instance the notches 144 on the motor shaft 124 come into contact with the notches 146 on the pump barrel 126 and after the pump barrel 126 has rotated relative to the motor shaft 124. In this case the connecting ports 150 and the bypass ports 148 are not aligned and the pump 106 operates similarly to a typical piston pump.

FIG. 8 shows the situation where the motor shaft 124 is not driven and as a result no torque is applied to the pump barrel 126. In this situation a spring (not shown) positioned between the pump barrel 126 and motor shaft 124 causes the pump barrel 126 and motor shaft 124 to rotate relative to each other so that the connecting ports 150 and the bypass ports 148 come into alignment. The pump 106 is now in the damping mode as fluid is able to freely flow through the pump 106 without the pump 106 being driven. It can be seen that the notches 144 and 146 are no longer in contact with each other. The bypass flow path 123 seen in FIG. 6 is opened by alignment of the connecting ports 150 with the bypass ports 148, allowing hydraulic fluid to flow between an inlet and outlet of the pump 106.

FIG. 9 shows the situation where the motor shaft 124 applies a negative torque to the pump barrel 126. It can be seen that the notches 144 have rotated to abut the opposite corresponding notch 146 on the pump barrel 126 in comparison to FIG. 8. In this situation the connecting ports 150 and bypass ports 148 are no longer aligned and again the pump 106 operates like a typical piston pump.

Figure 10:
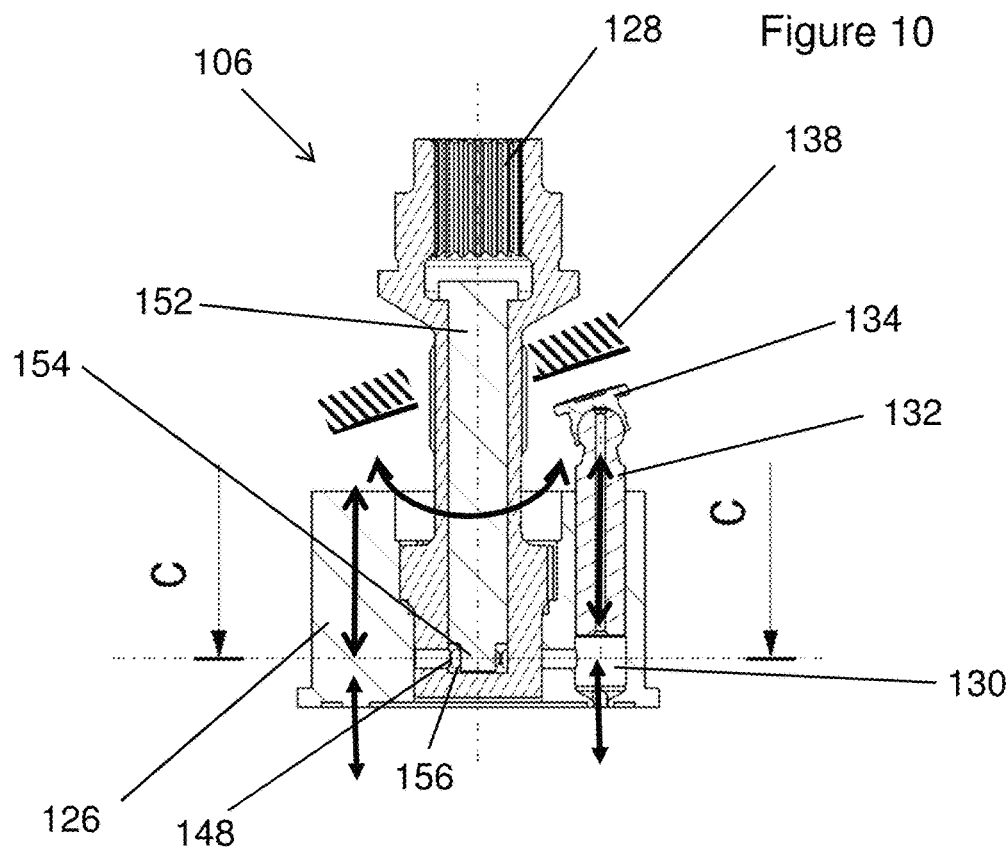
FIG. 10 shows a side cross-section of an exemplary pump according to the present disclosure in the active mode.
Figure 12:
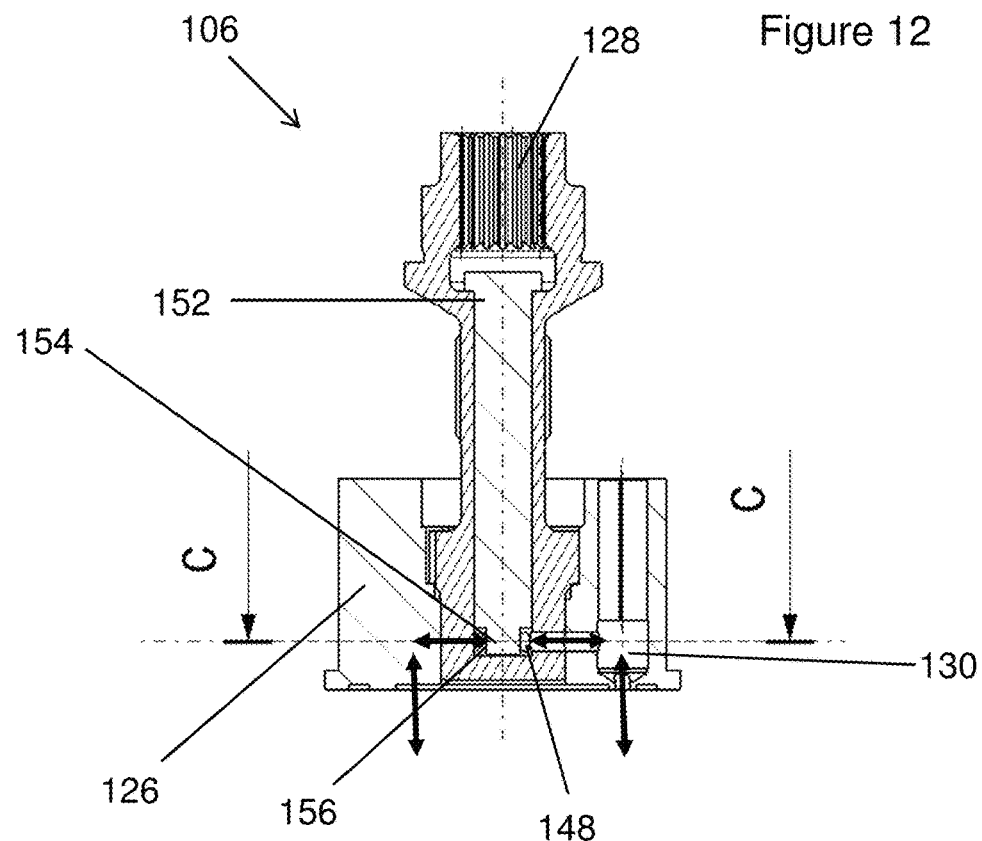
FIG. 12 shows a side cross-section of the exemplary pump according to the present disclosure in damping mode.

FIGS. 10 and 12 show a side cross-section of the pump 106 according to this example of the present disclosure. Within the motor shaft 124 is a pin 152. The pin 152 acts to restrict the flow of the fluid through the motor shaft 124 during the damping mode. The pin 152 can be seen to protrude into a chamber 156 within the motor shaft 124. This chamber 156 facilitates the flow of fluid through the motor shaft 124. The pin 152 is typically fixed in place during manufacture and is calibrated depending on the amount of damping which is required. This can be achieved by varying the diameter of the pin at the lowermost end 154. By using a pin 152 with a larger diameter this effectively acts to restrict the flow of fluid around the pin 152 inside the chamber 156 which thus reduces the damping effect. The pin 152 may also vary the amount of damping by extending into the chamber 156 by a different amount. When in the damping mode, if the ram 118 on the hydraulic actuator 112 is actuated upon by an external force such as air on an aerodynamic surface this causes the hydraulic actuator 112 to move which forces fluid around the system. In which case fluid flows into the cylinders 130 on one side of the pump barrel 126 through the connecting ports 150 into the bypass ports 148 and out through the bypass ports 148 to the connecting ports 150 on the opposite side of the pump barrel.

FIG. 10 shows the pump operating in an active mode and also shows the position of the pistons 132 within the cylinders 130. Depending on the rotation of the pump barrel 126, on one side of the pump barrel 126 the piston 132 acts to draw fluid into the cylinder 130 and on the opposite side it acts to displace the fluid out of the cylinder 130.

Figure 11:
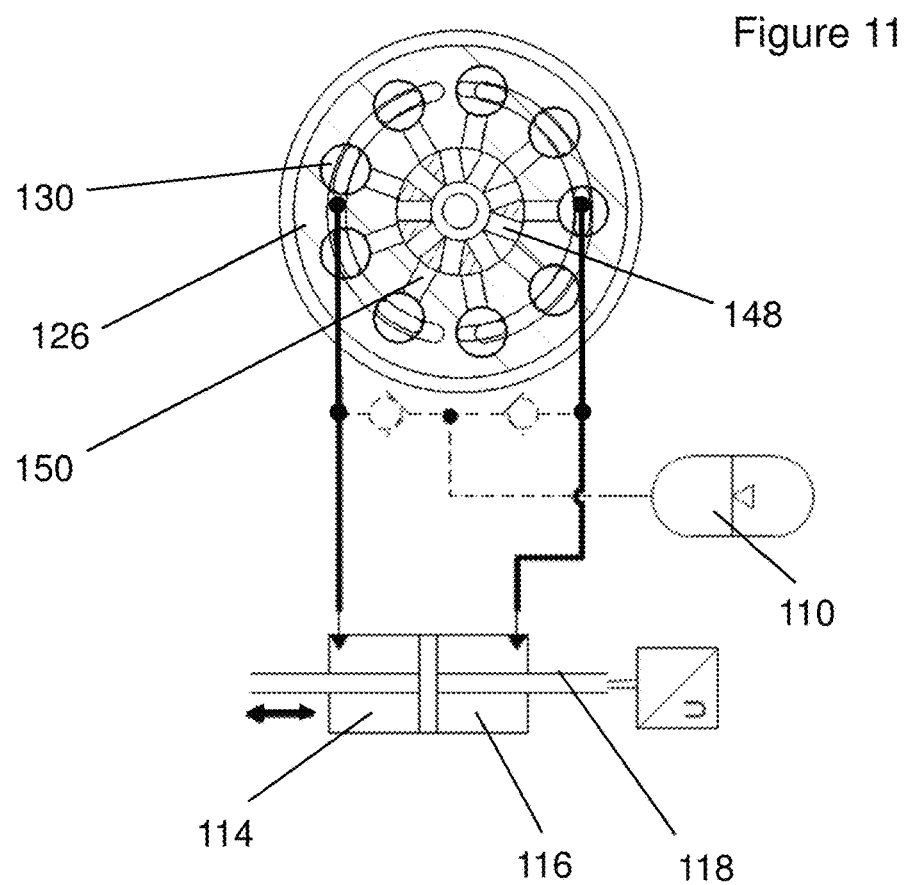
FIG. 11 shows a cross-sectional view of the pump and the fluid flow path in the active mode, taken along the line C-C seen in FIG. 10.

FIG. 11 shows a fluid flow diagram for the EHA in the active mode according to FIG. 10. In this mode the motor shaft 124 is driven and a torque is applied to the pump barrel 126. This causes the pump barrel 126 to rotate and the pistons 132 to reciprocate within the cylinders 130 of the pump barrel 126. The fluid path is connected to either side of the pump barrel 126 and therefore as it rotates it draws fluid in from one side, which drains fluid from one of the fluid chambers 114,116 of the hydraulic actuator 112 and forces fluid into the other fluid chamber 114,116 of the hydraulic actuator 112. It can be seen in this Figure that the connecting ports 150 do not align with the bypass ports 148 within the motor shaft 124 and therefore fluid is only able to pass in and out of the cylinders 130 as a result of the reciprocating motion of the pistons 132. This corresponds to the active mode, in which hydraulic fluid is pressurised by the pump, as seen in FIG. 5. In other words, the bypass flow path 123 is closed due to the misalignment of the bypass ports 148 and the connecting ports 150.

FIG. 12 shows the pump 106 in the damping mode. In this mode the motor shaft 124 is static and therefore no torque is applied to the pump barrel 126. In this case the connecting ports 150 and bypass ports 148 are brought into alignment. As previously described this may be achieved by a spring or other resilient member acting between the pump barrel 126 and the motor shaft 124 to bring the ports 148,150 into alignment.

Figure 13:
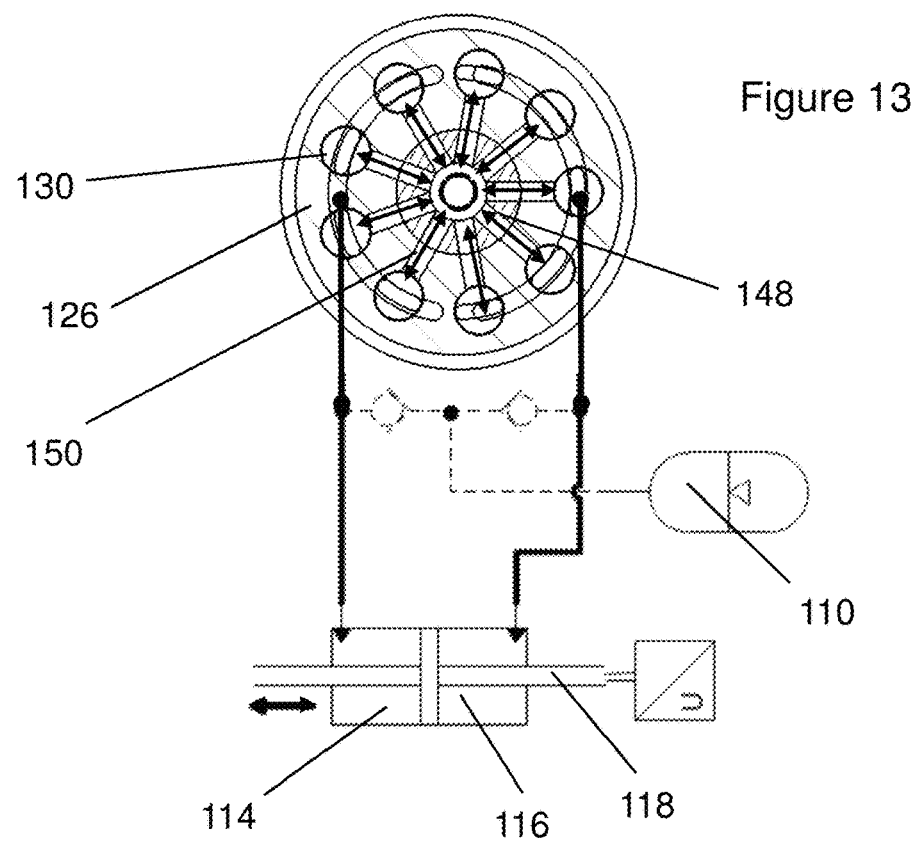
FIG. 13 shows a cross-sectional view of the pump and the fluid flow path in the damping mode, taken along the line C-C seen in FIG. 12.

FIG. 13 shows a fluid flow diagram for the EHA in the damping mode according to FIG. 12. It can be seen that the connecting ports 150 on the pump barrel 126 are aligned with the bypass ports 126 on the motor shaft 124. The arrows on this Figure show the direction of the flow of hydraulic fluid in the damping mode. It can be seen that fluid can enter all of the cylinders 130 on one side of the pump barrel 126 and exit via any of the cylinders 130 on the opposite side of the pump barrel 126. It can be seen that the pin 152 within the motor shaft 124 will act to restrict the flow of fluid through the motor shaft 124. This corresponds to the damping mode, in which hydraulic fluid is not pressurised by the pump, as seen in FIG. 6. In other words, the bypass flow path 123 is open due to the alignment of the bypass ports 148 and the connecting ports 150.

In the examples shown the bypass flow path 123 is achieved by the alignment of connecting ports 150 in the pump barrel 126 with bypass ports 148. However, it will be appreciated that this may be achieved by any other suitable arrangement which enables a bypass flow path to be created so that fluid can pass through the pump, through the motor shaft 124 or otherwise.

Figure 14:
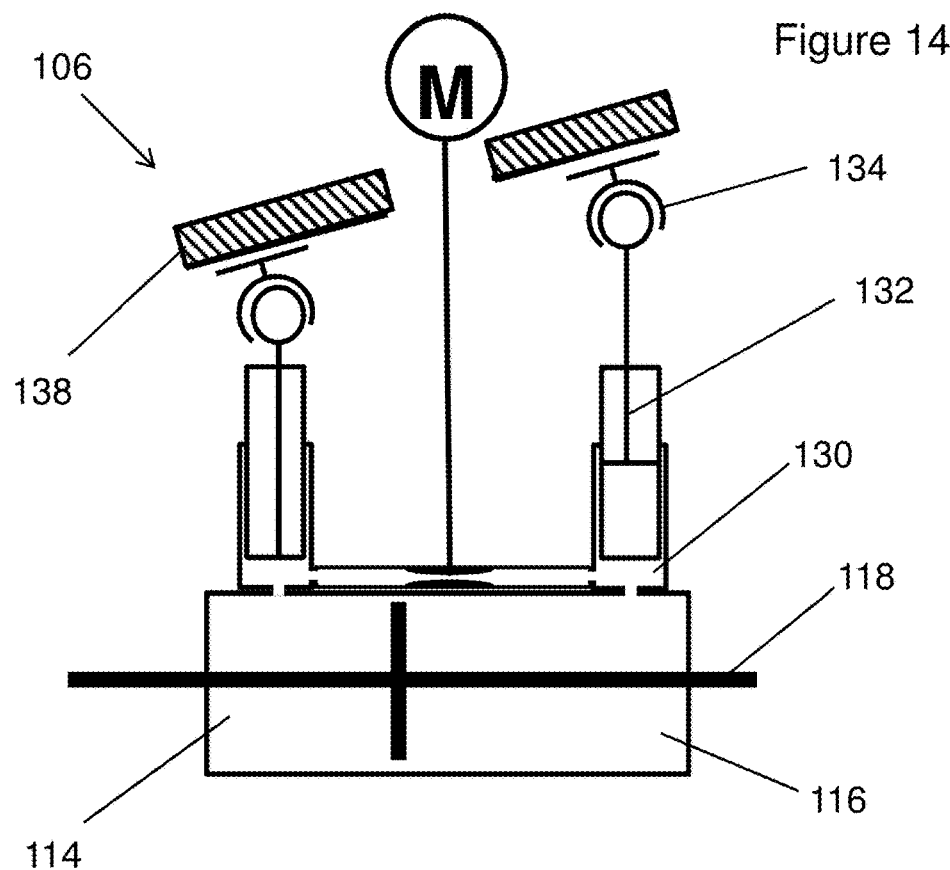
FIG. 14 shows a schematic diagram of a pump and the bypass flow path in the damping mode according to the present disclosure.
Figure 15:
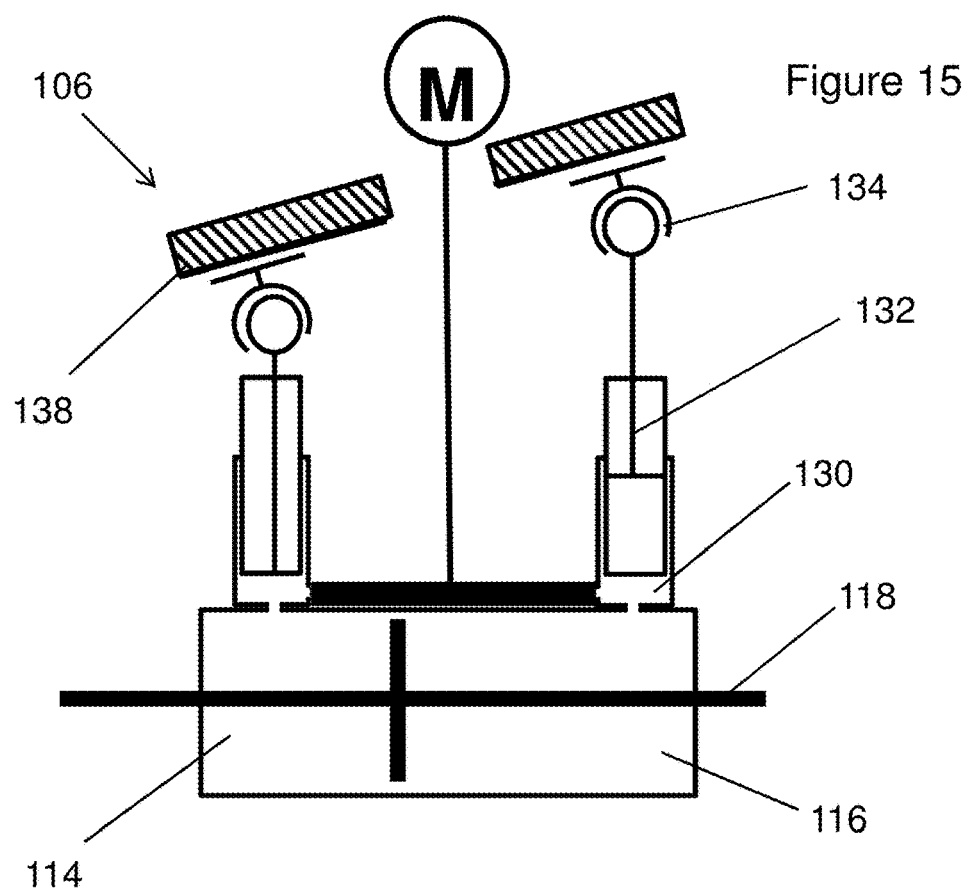
FIG. 15 shows a schematic diagram of a pump and the active flow path in the active mode according to the present disclosure.

FIGS. 10 to 13 illustrate an example of how the bypass flow path can be achieved by diverting the fluid flow through the motor shaft 124 when the pump is not driven by the electric motor. However there are other ways in which the bypass flow path can be achieved and FIG. 14 shows a general schematic diagram of the fluid flow path in the damping mode. Here it can be seen that, in damping mode, fluid can flow through the pump 106, from one chamber 114 via the cylinders 130 and to the other chamber 116. Of course this process could be reversed and for example fluid may flow from chamber 116 to chamber 114. FIG. 15 shows a general schematic diagram of the pump 106 in an active mode. Here it can be seen that there is no bypass fluid flow path established within the pump 106 and fluid can only flow in and out of each cylinder 130.

As previously mentioned there may be other ways to achieve a bypass flow path within a pump, and an alternative example can be seen in FIGS. 16 to 18. The pump 206 is driven by a similar motor shaft 224 as in previous examples. However, instead of the motor shaft 224 comprising notches to drive the pump barrel 226, the motor shaft 224 directly drives a collar 258 which is attached to a bypass port plate 262. The collar 258 comprises circumferential notches 244 which engage with corresponding notches 246 on the pump barrel 226. The notches are spaced apart such that the pump barrel 226 can rotate relative to the collar 258 and the bypass port plate 262 when there is no torque applied i.e. before they become engaged when the motor shaft 224 is driven to rotate. The bypass port plate 262 includes apertures 260 that may provide bypass ports for a bypass flow path, as will be explained below. Although not shown in these Figures, the pump 206 may also comprise a typical port plate 40, as shown in FIG. 4, positioned below the bypass port plate 262.

During the active mode, when the motor shaft 224 drives the collar 258, the bypass port plate 262 and barrel 226 are aligned such that the apertures 260 in the bypass port plate 262 are directly aligned with the cylinders 230 to provide an axial fluid flow. As the motor shaft 224 drives the collar 258, which subsequently drives the barrel 226, fluid is drawn in through the apertures 260 in the bypass port plate 262 and forced out of the cylinders 230. This is the case when both a positive or negative torque is applied to the barrel 226 as seen in FIGS. 16 and 18.

During damping mode, as depicted by FIG. 17, when the motor shaft 224 is not driven, a resilient member (not shown) causes the pump barrel 226 and bypass port plate 262 to rotate relative to each other such that the apertures 260 are no longer directly aligned with the cylinders 230. The apertures 260 become circumferentially offset from the axial cylinders 230.

In the damping mode the apertures 260 are circumferentially positioned such that each aperture 260 extends across or between two adjacent cylinders 230 to thereby form a bypass flow path allowing fluid to flow freely through the pump 206, around the motor shaft 224. Fluid is able to enter one cylinder 230 through a port acting as an inlet, on one side of the pump 206, and then pass to another cylinder 230 having a port acting as an outlet, on the other side of the pump 206. This is achieved by the fluid passing through one of the apertures 260 on the bypass port plate 262 into one of the cylinders 230. As this cylinder 230 is also linked to an adjacent cylinder 230, by the next circumferentially positioned aperture 260, fluid is then able to pass circumferentially from that cylinder 230, via the next aperture 260, to the next cylinder 230. This process continues until the fluid is able to reach the aperture 260 which is acting as an outlet. In this example a circumferential bypass flow path is achieved in the pump 206 around the circumference of the barrel 226, i.e. around the motor shaft 224 rather than through the motor shaft 224.

In the example shown in FIG. 16-18 it may be necessary for the bypass port plate 262 to be held against the barrel 226 using a head stop or link. This would allow the bypass port plate 262 to rotate relative to the barrel 226 but not move away axially from the barrel 226. This is relevant in this example as during the damping mode fluid may act to push the bypass port plate 262 and barrel 226 apart axially which may potentially cause leakage of fluid.

In the pump shown in FIGS. 16-18 the damping can be adjusted by adapting the size of the apertures 260 and/or their spacing. The level of damping may be adjusted during manufacture; this may for instance be achieved by machining the apertures 260 to a larger size and/or with a different spacing. It may also be possible to provide inserts that sit within the apertures 260 to restrict the flow of fluid and thus change the level of damping. Alternatively a set of bypass port plates 262 may be available and different plates 262 could be attached to the barrel 226 depending on the required level of damping. Such plates may be chosen during manufacture of the pump 206 or even interchanged at a later time during service life.

The pump 206 features a bypass flow path that is facilitated effectively by a two-part barrel: the barrel 226 and the bypass port plate 260. Manufacturing the pump in this way is particularly advantageous as machining the cylinders 230 within the barrel 226 and machining the apertures 260 in the separate bypass port plate 260 can more easily be achieved than machining both cylinders and bypass ports in a single part barrel.

The examples disclosed above relate to a rotary piston pump, but it will be appreciated that other types of pump may be used instead. Furthermore, although in the examples shown the angle of the cam plate is fixed, it is appreciated that changing the angle of the cam plate alters the amount of fluid drawn in and expelled by the pump, therefore it may be adjustable in order for the flow rate of fluid to be modified e.g. depending on the application of the pump.

The invention claimed is:

1. An electro hydrostatic actuator comprising:
an electric motor; and
a hydraulic pump driven by the electric motor, the pump configured to supply hydraulic fluid to a hydraulic actuator, the pump comprising:
an inlet and an outlet for the hydraulic fluid and an active flow path arranged therebetween such that, in an active mode of operation when the pump is driven by the electric motor, hydraulic fluid is actively drawn in through the inlet and exhausted out through the outlet; and
a bypass flow path arranged to open through the pump between the inlet and outlet such that, in a damping mode of operation when the pump is not driven by the electric motor, hydraulic fluid is able to pass through the pump along the bypass flow path between the inlet and outlet;
wherein the hydraulic pump is a rotary piston pump comprising a pump barrel driven to rotate by a motor shaft and a plurality of axial cylinders in the pump barrel arranged to receive reciprocating pistons, wherein the inlet has a fluid connection with at least one of the plurality of axial cylinders on one side of the pump barrel and the outlet has a fluid connection with at least one of the plurality of axial cylinders on an opposite side of the pump barrel; and
wherein the bypass flow path comprises one or more bypass ports in the motor shaft that provide a fluid path through the motor shaft between the inlet connected to at least one of the plurality of axial cylinders on one side of the pump barrel and the outlet connected to at least one of the plurality of axial cylinders on the opposite side of the pump barrel.

2. An electro hydrostatic actuator according to claim 1, wherein the bypass flow path is arranged to automatically open when the pump is not driven by the electric motor.

3. An electro hydrostatic actuator according to claim 2, wherein the pump further comprises a resilient member arranged to automatically open the bypass flow path through the pump when the pump is not driven by the electric motor.

4. An electro hydrostatic actuator according to claim 1, wherein the size of the bypass flow path is adjusted during manufacture and/or installation of the pump to provide a desired damping factor for the hydraulic actuator.

5. An electro hydrostatic actuator according to claim 1, wherein the bypass flow path comprises one or more connecting ports in the pump barrel that provide a fluid path from the inlet and/or the outlet to the one or more bypass ports in the motor shaft.

6. An electro hydrostatic actuator according to claim 5, wherein the one or more bypass ports in the motor shaft and the one or more connecting ports in the pump barrel are not aligned in the active mode of operation when the pump is driven, and wherein the one or more bypass ports in the motor shaft and the one or more connecting ports in the pump barrel are aligned in the damping mode of operation when the pump is not driven.

7. An electro hydrostatic actuator according to claim 1, wherein the pump barrel comprises an inner circumferential surface and the motor shaft comprises an outer circumferential surface, the inner and outer circumferential surfaces being drivingly connected by at least one engagement tooth on one of the inner and outer circumferential surfaces and at least one corresponding notch on the other of the inner and outer circumferential surfaces, arranged such that there is a circumferential gap therebetween allowing for relative rotation between the pump barrel and the motor shaft.

8. An electro hydrostatic actuator comprising:
an electric motor;
a hydraulic pump driven by the electric motor, the pump configured to supply hydraulic fluid to a hydraulic actuator, the pump comprising:
an inlet and an outlet for the hydraulic fluid and an active flow path arranged therebetween such that, in an active mode of operation when the pump is driven by the electric motor, hydraulic fluid is actively drawn in through the inlet and exhausted out through the outlet; and
a bypass flow path arranged to open through the pump between the inlet and outlet such that, in a damping mode of operation when the pump is not driven by the electric motor, hydraulic fluid is able to pass through the pump along the bypass flow path between the inlet and outlet; and
a sensor arranged to detect whether the bypass flow path is open between the inlet and outlet.

* * * * *